(12) United States Patent
Ishii et al.

(10) Patent No.: US 8,879,027 B2
(45) Date of Patent: Nov. 4, 2014

(54) LIQUID CRYSTAL DISPLAY DEVICE

(75) Inventors: Masato Ishii, Tokyo (JP); Masaaki Kitajima, Ibaraki (JP); Masahiro Ishii, Chiba (JP); Toshikazu Koudo, Hyogo (JP); Hidefumi Ishibashi, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 205 days.

(21) Appl. No.: 13/415,523

(22) Filed: Mar. 8, 2012

(65) Prior Publication Data
US 2012/0229733 A1 Sep. 13, 2012

(30) Foreign Application Priority Data

Mar. 10, 2011 (JP) ................................. 2011-052650

(51) Int. Cl.
*G02F 1/133* (2006.01)
*G09G 3/36* (2006.01)
*G02F 1/1333* (2006.01)

(52) U.S. Cl.
CPC ...... *G02F 1/133382* (2013.01); *G02F 2203/21* (2013.01); *G09G 2320/041* (2013.01)
USPC .............................................. 349/72; 345/90

(58) Field of Classification Search
CPC .................... G09G 2320/041; G09G 2320/04; G09G 3/36
See application file for complete search history.

(56) References Cited

U.S. PATENT DOCUMENTS

| | | | | |
|---|---|---|---|---|
| 2001/0033264 A1* | 10/2001 | Ishii | ................................. | 345/92 |
| 2002/0033814 A1* | 3/2002 | Kasahara et al. | ............. | 345/204 |
| 2003/0137521 A1* | 7/2003 | Zehner et al. | .................. | 345/589 |
| 2005/0007360 A1* | 1/2005 | Matsumoto | .................... | 345/204 |
| 2007/0057902 A1* | 3/2007 | Joung | ............................. | 345/102 |
| 2009/0128451 A1* | 5/2009 | Tokui | ............................... | 345/55 |
| 2009/0153464 A1* | 6/2009 | Furukawa et al. | ............. | 345/102 |
| 2010/0045211 A1* | 2/2010 | Kitamura et al. | ............. | 315/309 |
| 2012/0212520 A1* | 8/2012 | Matsui et al. | .................. | 345/690 |

FOREIGN PATENT DOCUMENTS

JP 2000-089197 3/2000
JP 2000-356976 12/2000

* cited by examiner

*Primary Examiner* — Jason Olson
*Assistant Examiner* — Carl Adams
(74) *Attorney, Agent, or Firm* — Hamre, Schumann, Mueller & Larson, P.C.

(57) ABSTRACT

On a liquid crystal panel, plural areas whose number is larger than that of temperature sensors are defined. In a memory, temperature relation information representing a relation between an output value of a temperature sensor and a temperature of each of the plural areas is stored. A controller acquires the output value of the temperature sensor and estimates, based on the temperature relation information and the acquired output value, the temperature of each of the plural areas. According to this configuration, the temperature of each of the plural areas defined on the liquid crystal panel can be obtained with a small number of temperature sensors.

6 Claims, 10 Drawing Sheets

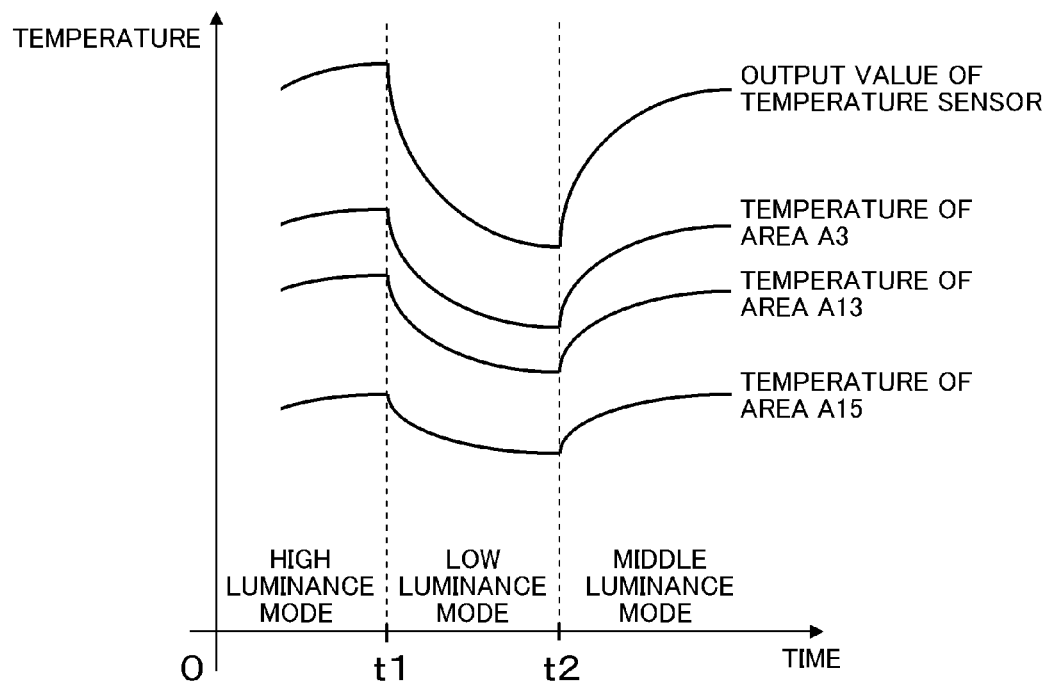

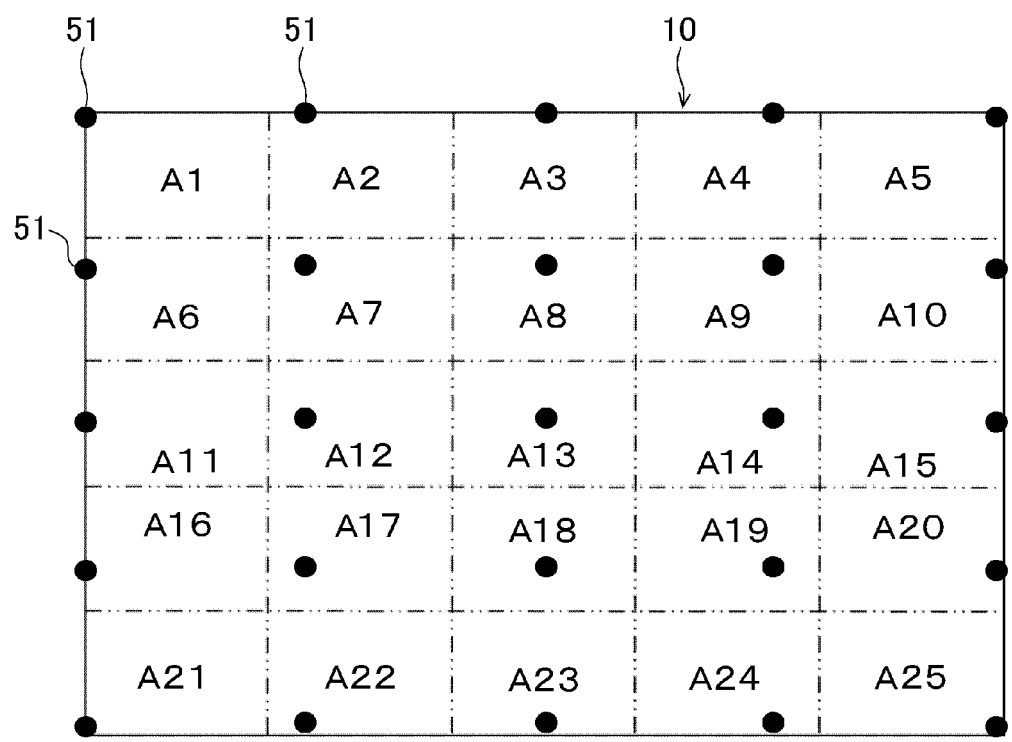

LIQUID CRYSTAL DISPLAY DEVICE

CROSS-REFERENCE TO RELATED APPLICATION

The present application claims priority from Japanese application JP2011-052650 filed on Mar. 10, 2011, the content of which is hereby incorporation by reference into this application.

BACKGROUND OF THE INVENTION

1. Field of the Invention

The present invention relates to a liquid crystal display device including a temperature sensor for obtaining temperature information of a liquid crystal panel.

2. Description of the Related Art

As disclosed in JP 2000-356976 A, a liquid crystal display device including a temperature sensor for detecting temperature of a liquid crystal panel has been proposed in the related art. Temperature information of the liquid crystal panel is used, for example, to correct the gray-scale value of each pixel.

SUMMARY OF THE INVENTION

The temperature of a liquid crystal panel sometimes varies depending on positions on the liquid crystal panel. For example, in a liquid crystal display device including a backlight unit having a light source at the edge of the backlight unit, the temperature of a portion (area) close to the edge of the liquid crystal panel is easily increased compared to those of the other areas. If the temperature of each area can be detected, control with higher accuracy is possible. However, when the same number of temperature sensors as areas are used, the cost of the liquid crystal display device is increased.

It is an object of the invention to provide a liquid crystal display device in which a temperature of each of plural areas defined on a liquid crystal panel can be obtained with a small number of temperature sensors.

A liquid crystal display device according to the invention includes: at least one temperature sensor; a liquid crystal panel having a plurality of areas defined thereon, wherein number of the plurality of areas is larger than that of the at least one temperature sensor; a memory having temperature relation information stored therein in advance, the temperature relation information being defined as information for representing a relation between an output value of the at least one temperature sensor and a temperature of each of the plurality of areas; and a controller which receives an output value of the at least one temperature sensor and estimates, based on the temperature relation information and the received output value of the at least one temperature sensor, a temperature of each of the plurality of areas. According to the invention, the temperature of each of the plural areas can be obtained with a small number of temperature sensors.

In one aspect of the invention, the controller may use a plurality of relation formulas defined by the temperature relation information to thereby estimate the temperatures of the plurality of areas, wherein each of the plurality of relation formulas represents the relation between the output value of the at least one temperature sensor and the temperature of each of the plurality of areas. According to this aspect, a continuously changing value can be calculated as the temperature of each of the areas, which can increase the accuracy of estimation of temperature. In this aspect, the memory may have a plurality of coefficients stored therein as the temperature relation information, wherein the plurality of coefficients is associated with the plurality of areas respectively, and the plurality of relation formulas may be defined by a fundamental relation formula to which the plurality of coefficients are applied, respectively. According to this aspect, it is no more necessary to store in the memory the plural relation formulas respectively corresponding to the plural areas. For example, the plural relation formulas respectively corresponding to the plural areas can be obtained from one fundamental relationship.

In another aspect of the invention, the controller may determine, the controller may determine, based on information changing according to an elapsed time since the start of driving of the liquid crystal display device, whether or not a present time falls in a steady-state period about temperature of the liquid crystal panel, and the controller may execute, as a process for estimating temperatures of the plurality of areas, processes different depending on whether the present time falls in the steady-state period or the present time does not fall in the steady-state period. According to this aspect, even if the present time is not the steady-state period, the temperature of the liquid crystal panel can be properly estimated. In this aspect, two temperature sensors disposed away from each other may be included as the at least one temperature sensor, and the controller may use, as the information changing according to the elapsed time since the start of driving of the liquid crystal display device, a difference in output value between the two temperature sensors. According to this aspect, it can be easily determined whether or not the present time corresponds to the steady-state period.

In still another aspect of the invention, the liquid crystal display device may further include a backlight unit including a light guide plate and a light source disposed at least one side of the light guide plate. According to this aspect, especially the process for estimating a temperature for each of the plural areas is effectively operated. Moreover, in this aspect, the liquid crystal display device may further include a circuit board having the at least one temperature sensor attached thereon and disposed along the at least one side of the light guide plate. By doing this, a correlation between the output value of the temperature sensor and the temperature of the liquid crystal panel can be increased. The liquid crystal display device may further include a rear frame made of metal and covering the rear side of the backlight unit, wherein the circuit board is fixed to the rear frame. According to this configuration, the correlation between the output value of the temperature sensor and the temperature of the liquid crystal panel can be further increased. Moreover, the liquid crystal display device may further include a plurality of circuit boards, wherein the at least one temperature sensor is attached to one of the plurality of circuit boards which is closest to the light source. According to this configuration, the correlation between the output value of the temperature sensor and the temperature of the liquid crystal panel can be further increased. Moreover, in this aspect, the light source may include plural LEDs. When LEDs are used in this manner, especially the process for estimating the temperature for each of the plural areas is effectively operated.

BRIEF DESCRIPTION OF THE DRAWINGS

FIG. 6 is a diagram showing an example of temporal change in output value of the temperature sensor and temporal change in actual temperature of each area.

FIG. 7 is a diagram showing a table in which plural areas are associated with coefficients.

FIG. 9A shows an example of change when the driving of the liquid crystal display device is resumed after a long time has elapsed since the end of previous driving (when the power is turned off) of the liquid crystal display device. FIG. 9B shows an example of change when the driving of the liquid crystal display device is resumed without a time interval since the end of previous driving of the liquid crystal display device.

FIG. 10 is a diagram showing an example of a gray-scale value table used for the correction of gray-scale value.

FIG. 11 is a diagram for explaining a method for obtaining coefficients for estimating a temperature of each area.

DETAILED DESCRIPTION OF THE INVENTION

Figure 1:
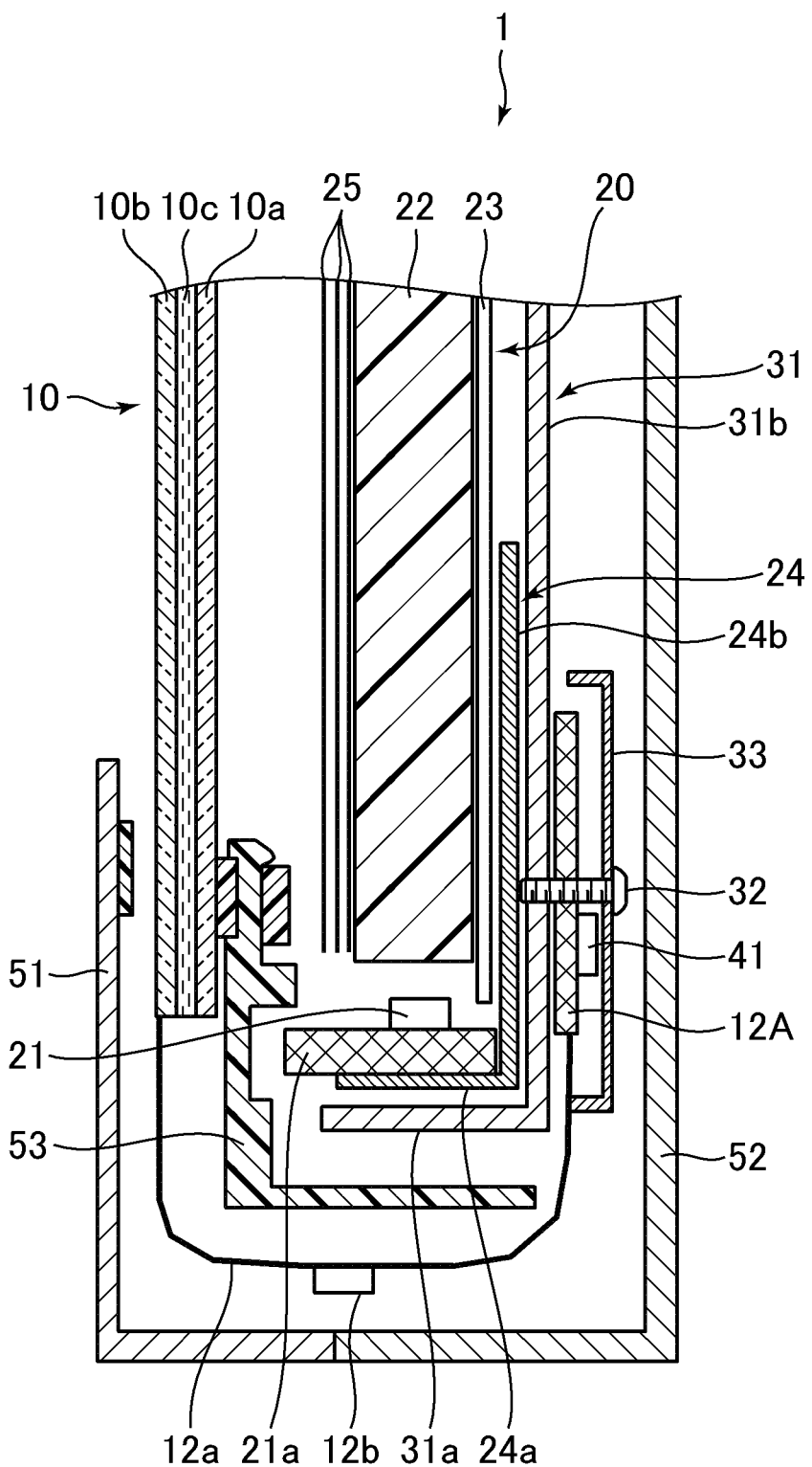
FIG. 1 is a cross-sectional view of a liquid crystal display device related to an embodiment of the invention.
Figure 2:
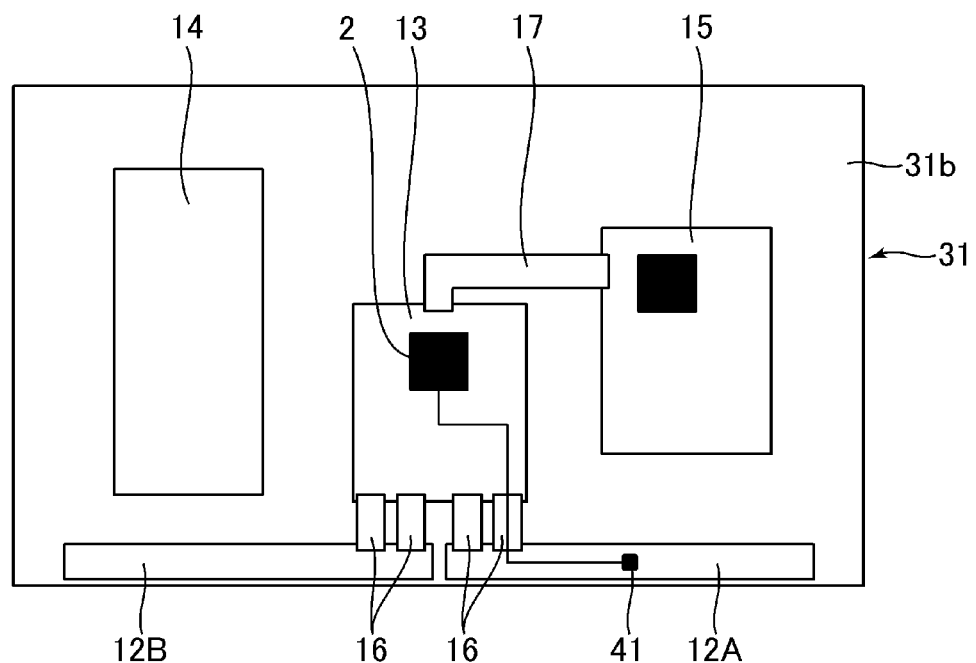
FIG. 2 is a schematic view showing the rear side of a rear frame covering the rear side of a liquid crystal panel and a backlight unit of the liquid crystal display device.

Hereinafter, an embodiment of the invention will be described with reference to the drawings. FIG. 1 is a cross-sectional view of a liquid crystal display device 1 related to an embodiment of the invention. FIG. 2 is a schematic view of the rear side of a rear frame 31 covering the rear side of a liquid crystal panel 10 and a backlight unit 20 included in the liquid crystal display device 1.

The liquid crystal display device 1 is a device functioning as, for example, a television. As shown in FIG. 1, the liquid crystal display device 1 has the liquid crystal panel 10. The liquid crystal panel 10 has two transparent substrates facing each other. One substrate (TFT substrate) 10a of the substrates has plural TFTs (Thin Film Transistors) formed thereon. The TFT substrate 10a has plural scanning lines and plural signal lines formed thereon in a matrix form. A gate voltage for turning on/off the TFT is applied to the scanning line. An image signal representing a gray-scale value of each pixel is applied to the signal line. The other substrate (color filter substrate) 10b has color filters formed thereon. Liquid crystal 10c is sealed between the TFT substrate 10a and the color filter substrate 10b.

As shown in FIG. 1, the liquid crystal display device 1 has the backlight unit 20 disposed on the rear side of the liquid crystal panel 10 and radiating light toward the rear face of the liquid crystal panel 10. The backlight unit 20 of this example has a light source at the edges thereof. The backlight unit 20 has plural LEDs (Light Emitting Diodes) 21 as a light source. In this example, the plural LEDs 21 are disposed along the lower and upper edges of the backlight unit 20. Particularly, the backlight unit 20 has a light guide plate 22, a circuit board 21a disposed along the lower side of the light guide plate 22, and a circuit board (not shown) disposed along the upper side of the light guide plate 22. The LEDs 21 are mounted on the circuit board 21a and face the lower face of the light guide plate 22. A reflector 23 is disposed on the rear side of the light guide plate 22. Light of the LEDs 21 emitted toward the light guide plate 22 is reflected forward by the reflector 23 while travelling within the light guide plate 22 and radiated to the rear face of the liquid crystal panel 10. On the front face of the light guide plate 22, plural optical sheets 25 are disposed. The light source of the backlight unit 20 is not limited to LED. For example, a cold-cathode tube may be provided as a light source. Moreover, the light source may be disposed only on one of the lower and upper sides of the light guide plate 22.

As shown in FIG. 1, the liquid crystal display device 1 has a heat discharging plate 24 made of metal. The heat discharging plate 24 is disposed along the edge of the backlight unit 20 to absorb heat from the LEDs 21, thereby preventing the heat from concentrating on the vicinity of the LEDs 21. The heat discharging plate 24 of this example has a lower plate portion 24a fixed to the lower face of the circuit board 21a and a rear plate portion 24b bending at the edge of the lower plate portion 24a and facing the rear face (particularly the rear face of the light guide plate 22) of the backlight unit 20. The lower plate portion 24a and the rear plate portion 24b are integrally formed. The heat discharging plate 24 has substantially the same length as the width of the backlight unit 20 in the horizontal direction (direction indicated by X1-X2 in FIG. 2). The heat of the LEDs 21 is easily conducted to a temperature sensor 41 described later through the heat discharging plate 24.

As shown in FIG. 1, the liquid crystal display device 1 further has the rear frame 31 made of metal. The rear frame 31 is a plate-like member and covers the rear side of the backlight unit 20. The rear frame 31 has a rear plate portion 31b facing the rear face (particularly the rear face of the light guide plate 22) of the backlight unit 20 and a lower plate portion 31a formed at the edge of the rear plate portion 31b. The lower plate portion 31a is disposed along the lower face of the circuit board 21a. In this example, the lower plate portion 24a of the heat discharging plate 24 is located between the lower plate portion 31a and the circuit board 21a. The rear plate portion 24b of the heat discharging plate 24 is located between the lowermost portion of the rear plate portion 31b and the light guide plate 22. Therefore, the heat of the LEDs 21 is easily conducted to the lowermost portion of the rear frame 31 through the heat discharging plate 24.

As shown in FIGS. 1 and 2, circuit boards 12A and 12B are fixed to the rear frame 31. The circuit boards 12A and 12B are fixed to the lowermost portion of the rear frame 31 and located along the lower edge of the backlight unit 20. With this configuration, the heat of the LEDs 21 is easily conducted to the circuit boards 12A and 12B. In this example as shown in FIG. 1, the rear plate portion 24b of the heat discharging plate 24 is located between the backlight unit 20 and the circuit boards 12A and 12B. With this configuration, the heat of the LEDs 21 is further easily conducted to the circuit boards 12A and 12B. The rear plate portion 24b extends upward further than the upper edge of the circuit boards 12A and 12B. With this configuration, the heat of the LEDs 21 is easily conducted to the wide range of the circuit boards 12A and 12B.

The liquid crystal display device 1 includes at least one temperature sensor used for temperature estimation of the liquid crystal panel 10. The liquid crystal display device 1 of this example includes one temperature sensor 41 as shown in FIGS. 1 and 2. The temperature sensor 41 is attached to the circuit board 12A.

As shown in FIG. 2, the liquid crystal display device 1 further has a TFT control circuit board 13, a power circuit board 14, and an application circuit board 15. In this example, all of the boards 13, 14, and 15 are fixed to the rear frame 31. In this example, a controller 2 and a memory 3, which will be described later, are mounted on the TFT control circuit board 13. On the application circuit board 15, a circuit functioning as an interface to external equipment is mounted. On the power circuit board 14, a power supply circuit which supplies driving power to each of the circuits included in the liquid crystal display device 1 is mounted.

The circuit board 12A to which the temperature sensor 41 is attached and the circuit board 12B which is disposed side by side with the circuit board 12A in the horizontal direction are circuit boards closest to the LEDs 21, among the plural circuit boards of the liquid crystal display device 1. In this example, the TFT control circuit board 13 is located at the central part of the rear frame 31 in the horizontal direction and located upper to the circuit boards 12A and 12B. The power circuit board 14 and the application circuit board 15 are disposed on the left and right sides of the TFT control circuit board 13 and located upper to the circuit boards 12A and 12B, respectively. Since the circuit board 12A of the two circuit boards 12A and 12B is located away from the power circuit board 14, the circuit board 12A is insusceptible to heat from the power circuit board 14. On the other hand, since the circuit board 12B is located away from the application circuit board 15, the circuit board 12B is insusceptible to heat from the application circuit board 15. When only one temperature sensor is used, one circuit board which can more properly detect a temperature may be selected from the circuit boards 12A and 12B. In the embodiment, in view of the influence of heat from the power circuit board 14, the temperature sensor 41 is disposed on the circuit board 12A. Therefore, an output value of the temperature sensor 41 is insusceptible to heat from the power circuit board 14.

A later-described process based on the output value of the temperature sensor 41 is executed in the controller 2 mounted on the TFT control circuit board 13. As shown in FIG. 2, the circuit boards 12A and 12B and the application circuit board 15 are connected to the TFT control circuit board 13 through FPCs (Flexible Printed Circuits) 16 and 17. As described above, the temperature sensor 41 is attached to the circuit board 12A. Therefore, it is unnecessary to provide dedicated wiring for inputting an output signal of the temperature sensor 41 to the controller 2. That is, the output signal of the temperature sensor 41 is input to the controller 2 through the FPC 16.

As described above, the circuit board 12A is so disposed that the heat of the LEDs 21 is easily conducted to the circuit board 12A. Therefore, the heat of the LEDs 21 is properly reflected in the output value of the temperature sensor 41. The temperature of the liquid crystal panel 10 is susceptible to the heat of the LEDs 21. Due to such an arrangement of the temperature sensor 41 and the circuit board 12A, the accuracy of temperature estimation of the liquid crystal panel 10 using the temperature sensor 41 can be increased.

As shown in FIG. 1, the liquid crystal display device 1 includes a plate-like board cover 33. The board cover 33 covers the circuit boards 12A and 12B. The temperature sensor 41 is located inside the board cover 33. Therefore, the output value of the temperature sensor 41 is insusceptible to outside air temperature. As a result, the accuracy of temperature estimation of the liquid crystal panel 10 using the temperature sensor 41 can be increased. The edge of the board cover 33 protrudes toward the rear frame 31. With this configuration, it is further difficult for outside air to enter the inside of the board cover 33.

Figure 3:
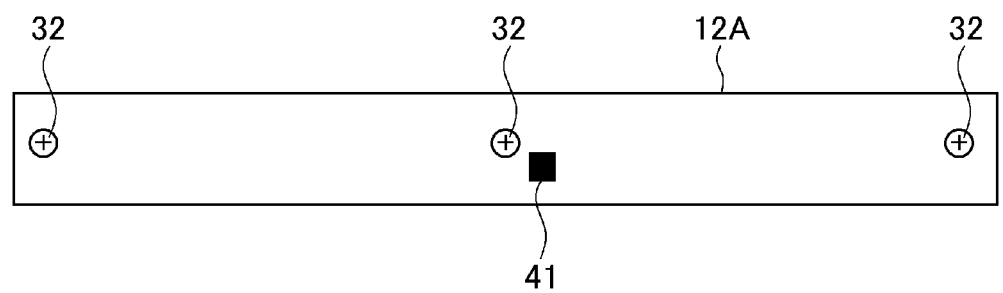
FIG. 3 is a schematic plan view of the circuit board illustrating positions of the screws and temperature sensor.

As shown in FIG. 1, the circuit board 12A is fixed to the rear frame 31 with screws 32. FIG. 3 is a schematic plan view of the circuit board 12A illustrating positions of the screws 32 and temperature sensor 41. In the drawing, the board cover 33 is not illustrated. As shown in FIG. 3, the circuit board 12A is fixed to the rear frame 31 with the plural screws 32. The screws 32 are made of metal, and part of heat of the rear frame 31 is conducted to the circuit board 12A through the screws 32. The position of the temperature sensor 41 is close to one of the screws 32. Therefore, heat from the LEDs 21 can be properly reflected in the output value of the temperature sensor 41. As shown in FIG. 1, the screw 32 of this example is inserted from the outside of the board cover 33 and fixes not only the circuit board 12A but also the board cover 33 to the rear frame 31. The temperature sensor 41 is interposed between the circuit board 12A and the board cover 33.

As shown in FIG. 1, the circuit boards 12A and 12B are connected to the lower edge of the liquid crystal panel 10 through an FPC 12a. An IC chip 12b is mounted on the FPC 12a. The IC chip 12b is located away from the temperature sensor 41. Therefore, the temperature sensor 41 is less exposed to heat from the IC chip 12b. In this example, the IC chip 12b is located outside the board cover 33. Therefore, the temperature sensor 41 is much less exposed to heat from the IC chip 12b. The IC chip 12b functions as a signal line drive circuit 4 described later. The circuit boards 12A and 12B are each generally referred to as a source board and each function as a junction circuit board connecting the signal line drive circuit 4 with the controller 2. The IC chip 12b applies a voltage according to a gray-scale value to a source of TFT.

As shown in FIG. 1, the liquid crystal display device 1 has a front cover 51 covering the outer periphery of the liquid crystal panel 10 and a rear cover 52 covering the rear side of the rear frame 31 and constituting the rear face of the liquid crystal display device 1. Further, the liquid crystal display device 1 has a middle frame 53.

Figure 4:
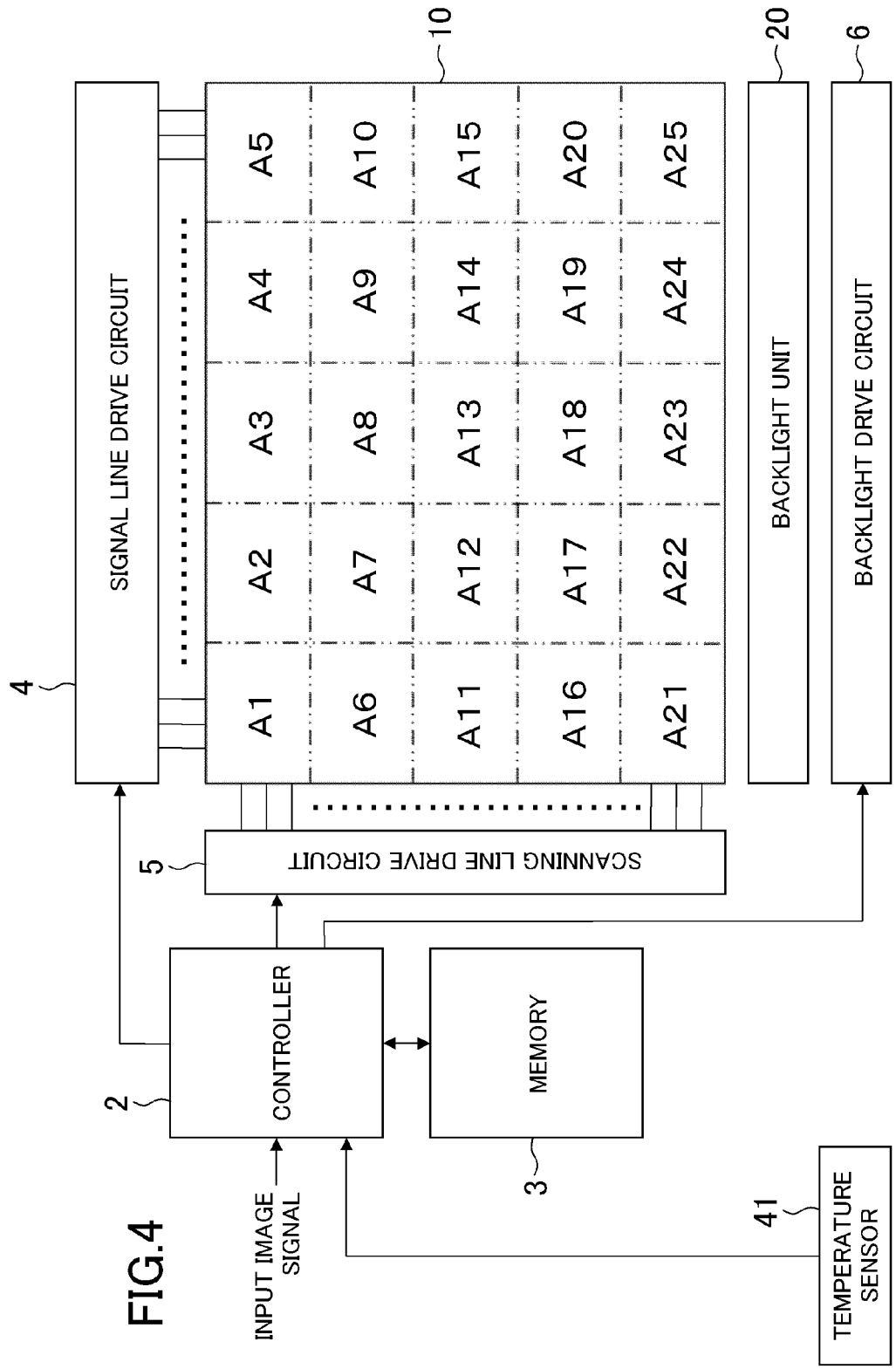
FIG. 4 is a block diagram schematically showing a configuration of the liquid crystal display device.

FIG. 4 is a block diagram schematically showing circuits included in the liquid crystal display device 1. As shown in the drawing, the liquid crystal display device 1 has the controller 2, the memory 3, the signal line drive circuit 4, a scanning line drive circuit 5, and a backlight drive circuit 6.

An input image signal received by a not-shown tuner or antenna and an input image signal generated by another device such as a video player are input to the controller 2. The controller 2 includes a CPU (Central Processing Unit), is connected to the memory 3 such as a ROM (Read Only Memory) or RAM (Random Access Memory), and executes programs stored in the memory 3. For example, the controller 2 generates, based on the input image signal, an output image signal representing a gray-scale value of each pixel and outputs the image signal to the signal line drive circuit 4. Moreover, the controller 2 generates, based on the input image signal, a timing signal for synchronizing the signal line drive circuit 4 with the scanning line drive circuit 5 and outputs the timing signal to each of the drive circuits. The temperature sensor 41 is connected to the controller 2. The controller 2 executes, based on the output value of the temperature sensor 41, a process for estimating the temperature of the liquid crystal panel 10. The process executed by the controller 2 will be described later in detail.

The scanning line drive circuit 5 is connected to the scanning lines formed on the TFT substrate 10a and applies a gate voltage in sequence to the plural scanning lines in time with the timing signal input from the controller 2. The scanning line drive circuit 5 is mounted on a not-shown board disposed on, for example, the left or right side of the liquid crystal panel 10.

The signal line drive circuit 4 is connected to the signal lines formed on the TFT substrate 10*a* and applies to each of the signal lines a voltage according to the output image signal from the controller 2 in time with the timing of applying the gate voltage. The signal line drive circuit 4 is mounted on the FPC 12*a* in the embodiment but may be mounted on, for example, the circuit board 12A or 12B, or the TFT substrate 10*a*.

The backlight drive circuit 6 supplies its driving power to the LEDs 21 based on a signal input from the controller 2. The controller 2 has, as drive modes of the backlight unit 20, plural drive modes depending on which the luminance of the LEDs 21 varies. For example, the controller 2 has a high luminance mode in which the LEDs 21 are driven at high luminance, a low luminance mode in which the LEDs 21 are driven at low luminance, and a middle luminance mode in which the LEDs 21 are driven at middle luminance. The backlight drive circuit 6 receives a signal representing a drive mode from the controller 2 and supplies the LEDs 21 with driving power corresponding to the drive mode. The backlight drive circuit 6 is mounted also on a not-shown board.

Figure 5:
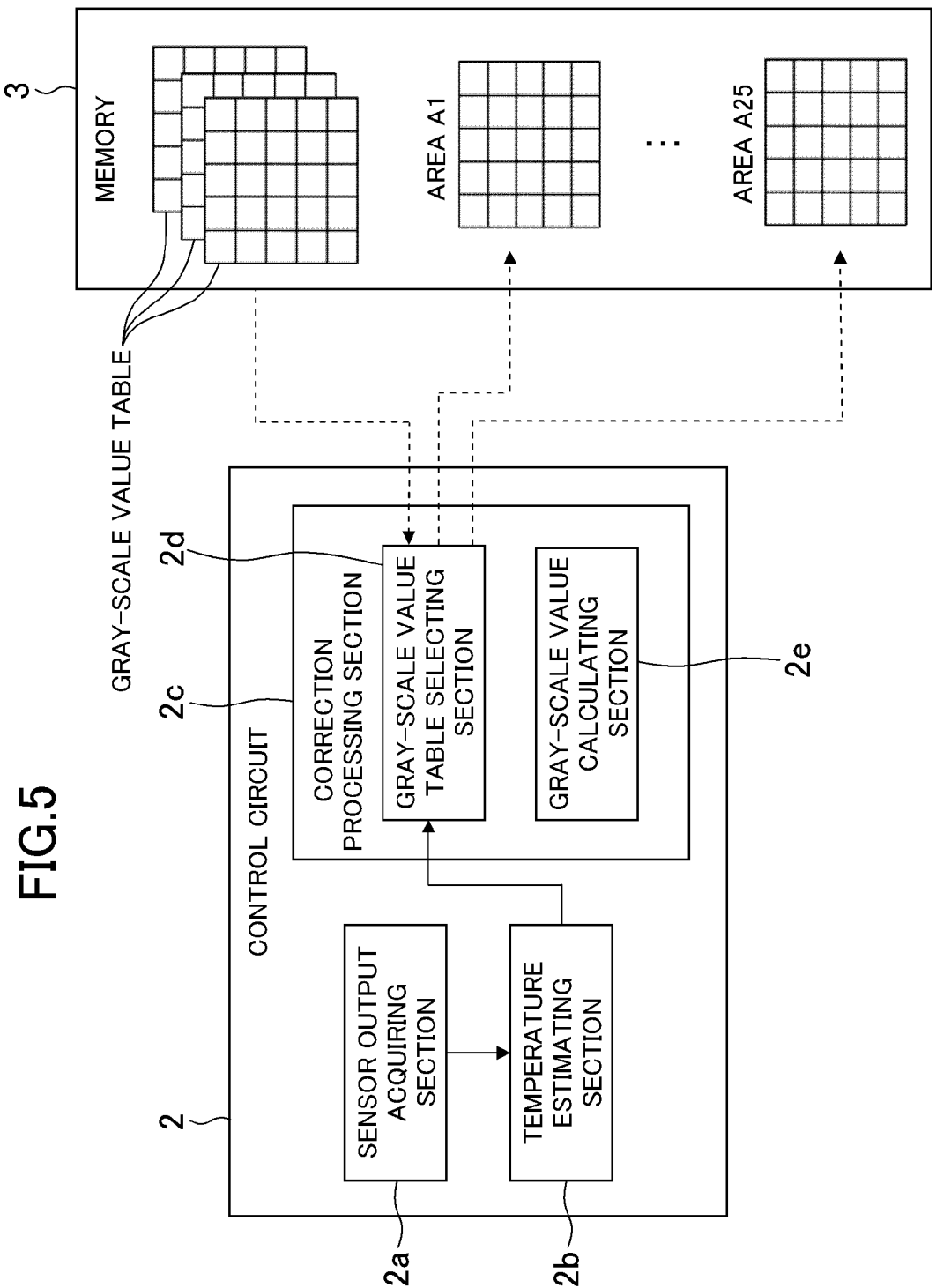
FIG. 5 is a block diagram showing functions of a controller of the liquid crystal display device.

FIG. 5 is a block diagram showing functions of the controller 2. As shown in the drawing, the controller 2 includes, as its functions, a sensor output acquiring section 2*a*, a temperature estimating section 2*b*, and a correction processing section 2*c*. The sensor output acquiring section 2*a* acquires the output value of the temperature sensor 41 with a predetermined sampling period (for example, 10 seconds). When output from the temperature sensor 41 is an output signal in the form of analog, the output is input as a digital signal to the controller 2 through a not-shown A/D conversion circuit. The sensor output acquiring section 2*a* acquires a value represented by the digital signal as the output value of the temperature sensor 41. On the other hand, when the output from the temperature sensor 41 is an output signal in the form of digital, the sensor output acquiring section 2*a* acquires a value represented by the digital signal as it is as the output value of the temperature sensor 41.

As described above, the temperature sensor 41 is attached at a position where the temperature sensor is susceptible to heat from the LEDs 21. Moreover, the temperature of the liquid crystal panel 10 is strongly affected by heat from the LEDs 21. Therefore, there is a correlation between the output value of the temperature sensor and the temperature of the liquid crystal panel 10. The temperature estimating section 2*b* estimates the temperature of the liquid crystal panel 10 based on the output value acquired in the sensor output acquiring section 2*a*.

As shown in FIG. 4, plural areas A1 to A25 whose number is larger than that of the temperature sensor 41 are defined on the liquid crystal panel 10. That is, the total area of the liquid crystal panel 10 is divided virtually into the plural areas A1 to A25. In the example shown in FIG. 4, the liquid crystal panel 10 is divided into five parts in each of the vertical and horizontal directions and has 25 areas in total. The number of areas defined on the liquid crystal panel 10 is not limited to that and may be appropriately changed according to the size of the liquid crystal panel 10.

FIG. 6 is a diagram showing an example of temporal change in output value of the temperature sensor 41 and temporal change in actual temperature of each area. In the drawing, temperatures (measured values) of the areas A3, A13, and A15 are shown as examples. Moreover in the drawing, the backlight unit 20 is driven in the high luminance mode until t1, driven in the low luminance mode from t1 to t2, and driven in the middle luminance mode after t2. As shown in the drawing, the temperature of any of the areas changes according to the switching of the drive mode of the backlight unit 20. In the liquid crystal display device 1, the LEDs 21 are disposed at the edges of the backlight unit 20. It is found from FIG. 6 that temperature distribution occurs at each of the areas in the liquid crystal panel 10. As shown in FIG. 1, the temperature sensor 41 is disposed at a position where the temperature of the LEDs 21 is easily detected. Therefore as shown in FIG. 6, there is a correlation between the output value of the temperature sensor 41 and the temperature of each of the areas. In the example described herein, a temperature (temperature of the area A3 in the drawing) of an area close to the position (the upper and lower edges of the backlight unit 20 in this example) of the LEDs 21 of the liquid crystal panel 10 is higher than temperatures of the other areas (the area A13 and the area A15 in the drawing). Moreover, the liquid crystal panel 10 has, on the rear side of the right-side and left-side portions of the liquid crystal panel 10, small number of components serving as a heat source such as a circuit board. Therefore, a temperature of the right-side or left-side portion of the liquid crystal panel 10 (temperature of the area A15 in the example of the drawing) is lower than a temperature (temperature of the area A13 in the drawing) of an area at the center of the panel. A change in temperature of the LEDs 21 is dominant over the temperature of each area of the liquid crystal panel 10. Therefore, the tendency of change in temperature of the areas A1 to A25 can be grasped from the output value of the temperature sensor 41 placed at a position where the temperature sensor is susceptible to the temperature of the LEDs 21.

In the embodiment, the memory 3 has temperature relation information stored therein in advance and representing a relation between the output value of the temperature sensor 41 and the temperature of each of the areas A1 to A25. The temperature estimating section 2*b* estimates the temperature of each of the plural areas A1 to A25 based on the temperature relation information and the output value acquired in the sensor output acquiring section 2*a*.

The temperature estimating section 2*b* uses plural relation formulas (hereinafter, temperature relation formula(s)) defined by the temperature relation information to estimate the temperatures of the areas A1 to A25. The plural temperature relation formulas represent the relations between the output value of the temperature sensor 41 and the temperatures of the areas A1 to A25, respectively. That is, the plural temperature relation formulas respectively correspond to the areas A1 to A25, and a relation between a temperature of one area and an output value of the temperature sensor 41 is represented by a temperature relation formula corresponding to the area.

In this example, plural coefficients respectively associated with the areas A1 to A25 are stored in the memory 3. A temperature relation formula for one area is defined by coefficients corresponding to the area. Moreover in this example, a fundamental relation formula to which the plural coefficients associated with each of the areas A1 to A25 can be applied selectively is stored in the memory 3. The fundamental relation formula is a formula serving as a source of the temperature relation formula for each of the areas, and coefficients corresponding to each area are applied to the fundamental relation formula, whereby a temperature relation formula for a relevant area can be obtained.

The fundamental relation formula is expressed by, for example, Expression (1) below.

$$T = K \times Td(i) + R \times F(Td(i)) + OFS \tag{1}$$

T is a temperature estimated for any of the areas. Td(i) is a latest output value acquired by the sensor output acquiring section 2a. K, R and OFS are constants. Specifically, K and R are coefficients, and OFS is an offset value. When a temperature of each area is calculated, specific constants corresponding to the area are applied. For example, when the temperature of the area A1 is calculated, constants ($K_{A1}$, $R_{A1}$, $OFS_{A1}$) associated with the area A1 are applied to the constants K, R, and OFS in the above expression (1). A function F is a filter function which outputs a value reflecting an output value acquired before the latest output value.

The function F is, for example, an IIR filter (Infinite Impulse Response Filter) and expressed by, for example, Expression (2) below.

$$F(Td(i)) = Td(i) \times (1-H) + F(Td(i-1)) \times H \tag{2}$$

Td(i−1) is an output value acquired at the previous process by the sensor output acquiring section 2a. H is a filter coefficient. When a temperature of each area is calculated, a specific coefficient corresponding to the area is applied. For example, when the temperature of the area A1 is calculated, a coefficient ($H_{A1}$) associated with the area A1 is applied to the coefficient H. Since the fundamental relation formula includes the filter function, a value output by the temperature relation formula is based not only on the latest output value of the temperature sensor 41 but also on at least the output value acquired at the previous process. This makes it possible to compensate a lag between a change of the output value of the temperature sensor 41 and a change of the actual temperature of the liquid crystal display panel 10. Further, this makes it possible to prevent a temperature calculated by the temperature estimating section 2b from following an instantaneous change or noise in output value acquired by the sensor output acquiring section 2a. The function F is not limited to the IIR filter. The function F may be, for example, a FIR filter (Finite Impulse Response Filter).

As shown by Expression (1), the temperature relation formula defined by the fundamental relation formula and the constants associated with each of the areas is a first order filter function for the output value of the temperature sensor 41. Therefore, the processing load of temperature estimation can be reduced. The temperature relation formula is not limited to that described above. For example, the temperature relation formula may be a second order filter function or third order filter function for the output value of the temperature sensor 41.

As described above, the temperature relation formula is defined by the plural constants (hereinafter referred to as constant group) associated with the areas A1 to A25. For example, the temperature relation formula for the area A1 is defined by a constant group ($K_{A1}$, $R_{A1}$, $OFS_{A1}$, and $H_{A1}$). In this example, a table (hereinafter, constant table) which associates areas with constant groups, respectively, shown in FIG. 7, is stored in the memory 3.

In this embodiment where such temperature relation information is stored in the memory 3, the temperature estimating section 2b executes the following process for estimating the temperature of each area. In the process for estimating the temperature of an area Am (m=1, 2, . . . , and 25 in this example), the temperature estimating section 2b first refers to the constant table to select a constant group corresponding to the area Am. Then, the temperature estimating section 2b uses a fundamental relation formula to which the selected constant group is applied, that is, a temperature relation formula representing a relation between the output value of the temperature sensor 41 and the temperature of the area Am to calculate the temperature of the area Am from the output value acquired by the sensor output acquiring section 2a. The temperature estimating section 2b executes the process described above for each area to estimate the temperatures of all the areas A1 to A25. The temperature estimating section 2b executes the process described above with a predetermined period (for example, the same period as the sampling period of the sensor output acquiring section 2a) to calculate the temperatures of the areas A1 to A25.

The process executed by the temperature estimating section 2b and the information stored in the memory 3 is not limited to that described above. For example, plural temperature relation formulas respectively associated with the areas A1 to A25 may be previously stored in the memory 3 as temperature relation information. Moreover, plural tables representing temperatures of the areas A1 to A25 may be stored in the memory 3 respectively in association with plural output values which can be output by the temperature sensor 41. In this case, the temperature estimating section 2b reads from the memory 3 a table corresponding to an output value acquired in the sensor output acquiring section 2a. Then, the temperature estimating section 2b defines temperatures which are set in the read table as estimated temperatures of the areas A1 to A25.

The relation between the output value of the temperature sensor 41 and the temperature of the liquid crystal panel 10 varies depending on an elapsed time since the start of driving (when the power is turned on) of the liquid crystal display device 1. After a sufficient time has elapsed since the start of driving, there is the correlation, illustrated in FIG. 6, between the temperature of each of the areas and the output value of the temperature sensor 41. However, under the situation where the liquid crystal display device 1 is not driven, both of a temperature in the vicinity of the temperature sensor 41 and the temperature of each area depend on the temperature of an environment where the liquid crystal display device 1 is placed, and are substantially equal to each other. Therefore, until a sufficient time has elapsed since the start of driving of the liquid crystal display device 1, the temperature of each of the areas and the output value of the temperature sensor 41 sometimes do not have the relation represented by the temperature relation formula described above.

Figure 8:
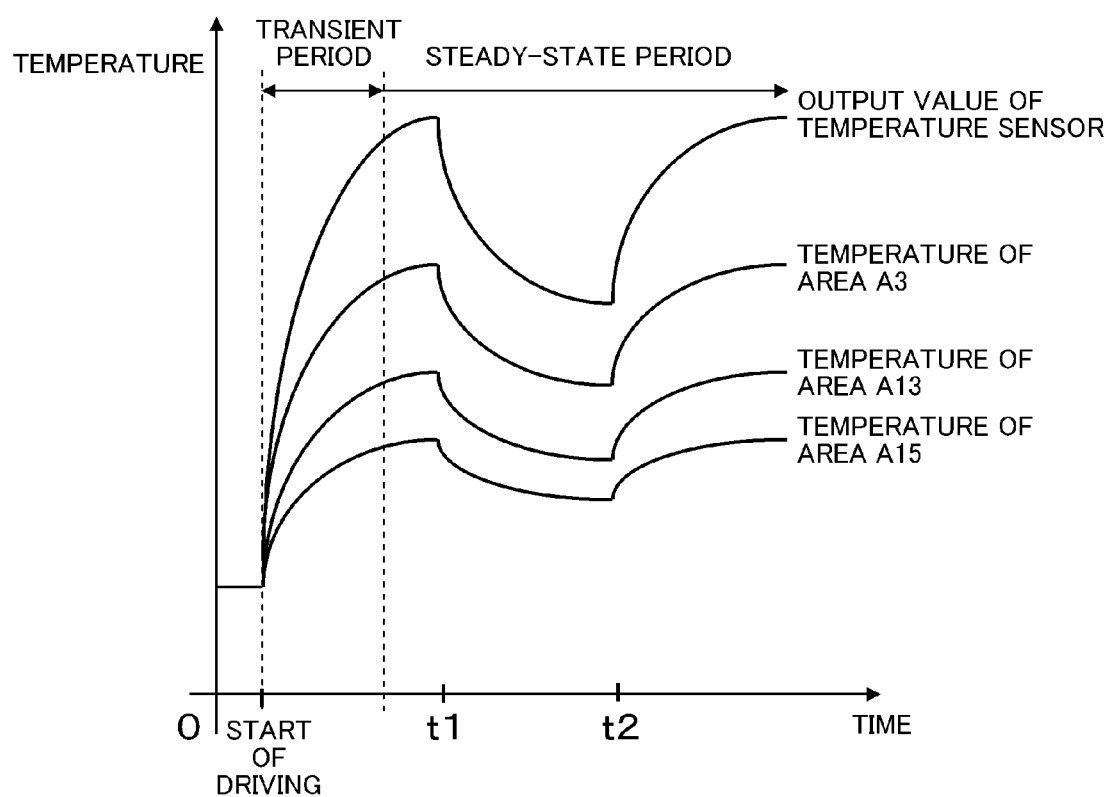
FIG. 8 is a diagram showing an example of temporal changes in output value of the temperature sensor and in temperature of each area. In this drawing, the changes since the start of driving (time when the power is turned on) of the liquid crystal display device are shown.

FIG. 8 is a diagram showing an example of temporal changes in output value of the temperature sensor 41 and in temperature of each area. In the drawing, the changes since the start of driving of the liquid crystal display device 1 are shown. Moreover in the drawing, temperatures of the areas A3, A13, and A15 are shown as examples. In the case shown in the drawing, the backlight unit 20 is driven in the high luminance mode from the start of driving when the power is turned on to t1, driven in the low luminance mode from t1 to t2, and driven in the middle luminance mode after t2. As shown in the drawing, after a sufficient time has elapsed (that is, in a steady-state period shown in the drawing) since the start of driving of the liquid crystal display device 1, there is a high correlation represented by the temperature relation formula described above. However, until a sufficient time has elapsed (that is, in a transient period shown in the drawing) since the start of driving of the liquid crystal display device 1, a relation between the temperature of each of the areas and the output value of the temperature sensor 41 is not similar to that of the steady-state period, and a difference between the temperature of each of the areas and the output value of the temperature sensor 41 is gradually increased over time.

Therefore, the temperature estimating section 2b may determine, based on information changing according to the elapsed time since the start of driving of the liquid crystal display device 1, whether or not a present time falls to the steady-state period. Then, the temperature estimating section 2b may estimate the temperatures of the areas A1 to A25 by a process different depending on whether or not the present time falls to the steady-state period.

The process for determining whether or not the present time falls to the steady-state period is executed as follows, for example. The temperature estimating section 2b initiates timing at the start of driving of the liquid crystal display device 1 and determines, based on the elapsed time since the start of driving, whether or not the present time has reached the steady-state period. That is, the temperature estimating section 2b determines that the present time has reached the steady-state period when the elapsed time since the start of driving exceeds a predetermined time. Moreover as shown in FIG. 8, the output value of the temperature sensor 41 abruptly changes immediately after the start of driving of the liquid crystal display device 1. Therefore, the temperature estimating section 2b may determine, based on the rate of change in output value of the temperature sensor 41, whether or not the present time falls to the steady-state period. For example, the temperature estimating section 2b may determine, based on differences each defined as a difference between two output values acquired with a predetermined period, whether or not the present time falls to the steady-state period. If the difference is smaller than a threshold value, the present time may be determined as falling to the steady-state period.

If the present time falls to the steady-state period, the temperature estimating section 2b uses the constant group and fundamental relation formula described above to estimate the temperature of each area. On the other hand, if the present time does not fall to the steady-state period, that is, if the present time falls to the transient period, the temperature estimating section 2b uses, for example, a constant group different from the constant group described above and/or a relation formula different from the fundamental relation formula described above to estimate the temperature of each area. In this case, the memory 3 has temperature relation information stored therein which represent a relation between the output value of the temperature sensor 41 and the temperature of each area in the transient period and which is different from the temperature relation information described above to be used in the steady-state period. Also the temperature relation information in the transient period is composed of, for example, a fundamental relation formula and a constant group associated with each area. As another example, in the transient period, the temperature estimating section 2b may correct a value calculated using the constant group and fundamental relation formula described above and define the corrected value as the temperature of each area in the transient period. In this case, the temperature estimating section 2b may correct the value obtained from the constant group and the fundamental relation formula described above used in the steady-state period based on, for example, the rate of change in output value of the temperature sensor 41.

Figure 9A:
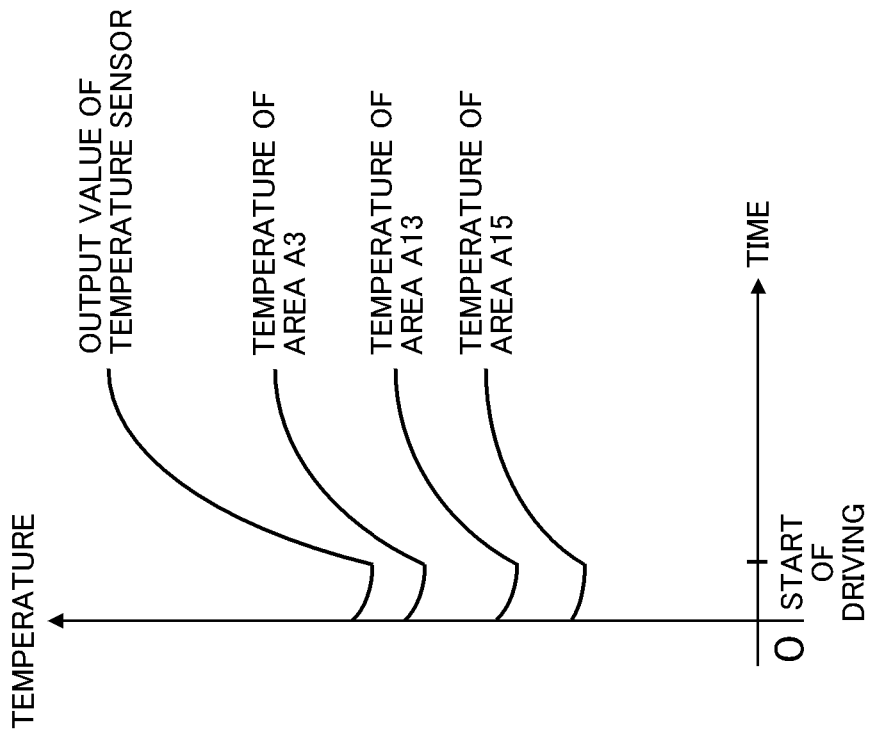
FIGS. 9A and 9B are diagrams each showing a change in temperature of each area in a transient period.
Figure 9B:
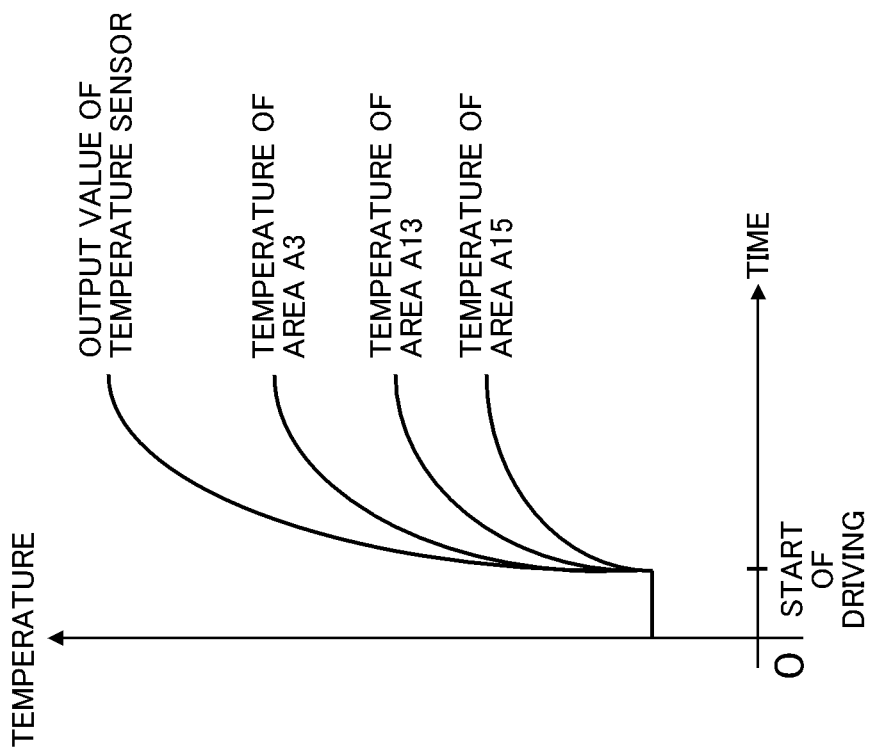

FIGS. 9A and 9B are diagrams each showing a change in temperature of each area in the transient period. In the case shown in those diagrams, changes in temperature of the areas A3, A13, and A15 are shown as examples. FIG. 9A shows an example of change in the case where the driving of the liquid crystal display device 1 is resumed after along time has elapsed since the end of previous driving (when the power is turned off). FIG. 9B shows an example of change in the case where the driving is resumed without a sufficient time interval since the end of previous driving. When a long time has elapsed since the end of driving, a temperature in the vicinity of the temperature sensor 41 and the temperature of each area are equal to each other. Therefore as shown in FIG. 9A, at the start of driving after a long time has elapsed, temperatures of all areas are equal to each other. In a case where only a short time has elapsed, however, differences in temperature among the areas are not eliminated. Therefore, when the driving is resumed without a sufficient time interval after the end of previous driving, the differences in temperature among the areas already exist at the start of driving of the liquid crystal display device 1 as shown in FIG. 9B.

Therefore, the temperature estimating section 2b may change, based on information changing according to the elapsed time since the end of previous driving, the constant group and/or fundamental relation formula used in the transient period. This process can be executed, for example, as follows.

The temperature estimating section 2b stores, at the end of driving of the liquid crystal display device 1, the output value of the temperature sensor 41 in the memory 3. Thereafter, when the driving is resumed, the temperature estimating section 2b may determine, based on a difference between the output value of the temperature sensor 41 acquired at the start of driving and the output value stored in the memory 3 at the end of previous driving, whether or not a sufficient time has elapsed since the end of previous driving. For example, if the difference between the output value of the temperature sensor 41 acquired at the start of driving and the output value stored in the memory 3 at the end of previous driving is larger than a threshold value, the temperature estimating section 2b determines that a sufficient time has elapsed since the end of previous driving. The temperature estimating section 2b may change the constant group and/or fundamental relation formula used in the transient period after the start of driving depending on whether or not a sufficient time has elapsed since the end of previous driving.

The correction processing section 2c corrects various kinds of parameters related to an image to be displayed on the liquid crystal panel 10. The correction processing section 2c calculates parameters related to an image to be displayed in an area Am of the plural areas A1 to A25 based on a temperature estimated for the area Am. The parameters are, for example, gray-scale values of pixels formed on the TFT substrate 10a or voltages to be applied to a common electrode (not shown) formed on the TFT substrate 10a or the color filter substrate 10b. That is, in one example, the correction processing section 2c corrects, based on the estimated temperature, a gray-scale value calculated from an input image signal and outputs a signal corresponding to the corrected gray-scale value as an output image signal (such a correction is executed as for example, a correction for eliminating crosstalk between two successive frames). In another example, the correction processing section 2c corrects the voltages to be applied to the plural electrodes provided at the edge of the common electrode based on temperatures of the areas A1 to A25 (Vcom correction).

Herein, the correction processing section 2c which corrects gray-scale values will be described as an example. The correction processing section 2c corrects the gray-scale values of pixels formed in an area Am based on a temperature estimated for the area Am. As shown in FIG. 5, the correction processing section 2c includes a gray-scale value table selecting section 2d and a gray-scale value calculating section 2e.

The gray-scale value calculating section 2e calculates, based on a gray-scale value of a previous frame and a gray-scale value (gray-scale value before correction) according to an input image signal of a next frame, a gray-scale value (gray-scale value after correction) of the next frame and outputs a signal corresponding to the calculated gray-scale value as an output image signal. The memory 3 has a table stored therein in which candidates for gray-scale values calculated by the gray-scale value calculating section 2e. In the gray-scale value table, the gray-scale value of the next frame is set in association with the gray-scale value of the previous frame and the gray-scale value according to the input image signal of the next frame. The memory 3 has plural gray-scale value tables stored therein which are in association with temperatures. The gray-scale value table selecting section 2d selects the gray-scale value table based on a temperature calculated in the temperature estimating section 2b for each area. That is, the gray-scale value table selecting section 2d selects the gray-scale value table for each of the plural areas A1 to A25.

FIG. 10 is a diagram showing an example of a gray-scale value table. In the table in the diagram, gray-scale values according to the input image signals of the next frame are shown in the top row. Gray-scale values set in the previous frame are shown in the leftmost column. In the memory 3, such plural gray-scale value tables are stored in association with temperatures (refer to FIG. 5).

When the temperature estimating section 2b calculates a temperature for each of the areas A1 to A25, the gray-scale value table selecting section 2d selects, based on each of the temperatures, the gray-scale value table for each of the plural areas A1 to A25. Then as shown in FIG. 5, the gray-scale value table selecting section 2d stores the selected gray-scale value tables, in association with the areas A1 to A25, in a memory area defined previously within the memory 3. That is, after selecting the gray-scale value table based on the temperature of an area Am, the gray-scale value table selecting section 2d stores the selected gray-scale value table in the memory 3 in association with the area Am. When a new temperature is calculated in the temperature estimating section 2b, the gray-scale value table selecting section 2d selects the gray-scale value table based on the new temperature and updates the gray-scale value table which has been already stored to the newly selected gray-scale value table.

The gray-scale value calculating section 2e calculates the gray-scale values of pixels in each area with reference to the gray-scale value table associated with a relevant area. That is, when calculating the gray-scale value of one pixel, the gray-scale value calculating section 2e selects a gray-scale value table associated with an area including the pixel. Then, the gray-scale value calculating section 2e refers to the selected gray-scale value table to calculate a gray-scale value corresponding to a gray-scale value set for the pixel in the previous frame and a gray-scale value of the pixel according to the input image signal for the next frame. The gray-scale value calculating section 2e executes the process described above for all pixels in one frame.

In the gray-scale value table, all values from a minimum gray-scale value (0 in FIG. 10) to a maximum gray-scale value (255 in FIG. 10) may be defined as the gray-scale values in the previous frame and the gray-scale values according to the input image signals for the next frame. Moreover, like the gray-scale value table shown in FIG. 10, the gray-scale values in the previous frame and the gray-scale values according to the input image signals for the next frame may be set stepwise from the minimum gray-scale value to the maximum gray-scale value. That is, a difference larger than 1 may be provided between two successive gray-scale values. In using the gray-scale value table in FIG. 10, when a gray-scale value in the previous frame or a gray-scale value according to the input image signal for the next frame is a value between two successive gray-scale values, the gray-scale value calculating section 2e executes an interpolation process which interpolates a value between two successive gray-scale values.

Figure 12:
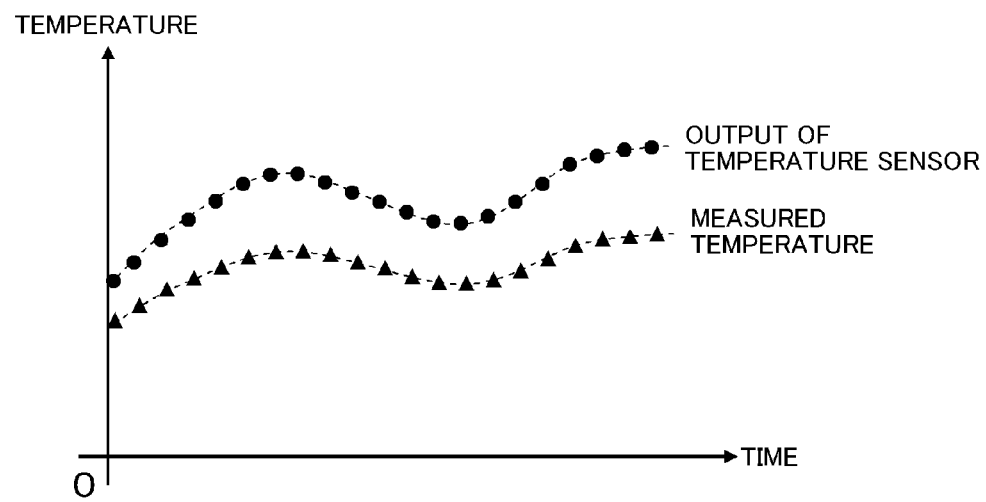
FIG. 12 is a diagram showing an example of a result of temperature measurement conducted in determining constants.

A method for obtaining constants used for the temperature estimation of the areas A1 to A25 in manufacturing process of the liquid crystal display device 1 will be described. FIG. 11 is a diagram for explaining the arrangement of temperature detectors 51 used in obtaining the constants. First, the temperature detector 51 (for example, a thermocouple) is disposed at plural positions (25 positions in this example) on the surface of the liquid crystal panel 10. For example as shown in FIG. 11, one temperature detector 51 is provided in each of the areas A1 to A25. Then, the liquid crystal display device 1 is driven while changing the drive mode of the backlight unit 20 in plural temperature environments. For example, the drive mode (the high luminance mode, the middle luminance mode, and the low luminance mode) of the backlight unit 20 is changed in order in an environment of 0 degree, and thereafter the drive mode of the backlight unit 20 is changed in another temperature environment. At that time, an actual temperature is measured by the temperature detector 51 provided on the liquid crystal panel 10 at a fixed time interval (for example, an interval of 10 seconds), and the output value of the temperature sensor 41 is acquired at the fixed time interval. FIG. 12 illustrates temporal changes in output value of the temperature sensor 41 and in measured temperature obtained by the temperature detector 51. With the temperature measurement described above, as shown in FIG. 12, a number of measured temperatures for each position (temperature measurement position) at which a temperature detector 51 is attached and the output values of the temperature sensor 41 respectively corresponding to the measured temperatures are obtained. Then, an approximate expression between a measured temperature and the output value of the temperature sensor 41 is obtained. When one temperature detector 51 is provided in each area, that is, when one temperature measurement position corresponds to one area, an approximate expression for an area Am including constant $K_{Am}$, $R_{Am}$, $H_{Am}$, and $OFS_{Am}$ is obtained from the output value of the temperature sensor 41 and a measured temperature at a temperature measurement position provided in the area Am. An estimated temperature corresponding to a temperature measurement position is deemed, in the process of the temperature estimating section 2b, as an estimated temperature of the entire of an area including the temperature measurement position. Specifically, the estimated temperature of an area Am is represented by the estimated temperature at the temperature measurement position provided in the area Am. The derivation of the approximate expression can be carried out by, for example, the method of least squares. That is, a value which minimizes the sum of the squares of the difference between the temperature (temperature obtained from Expression (1)) of an area Am based on the output value of the temperature sensor 41 and the measured temperature of the area Am is defined as constants for the area Am. In the case where the constants are derived in this manner, a temperature estimation error can be reduced when the drive mode of the backlight unit 20 is changed.

Figure 13:
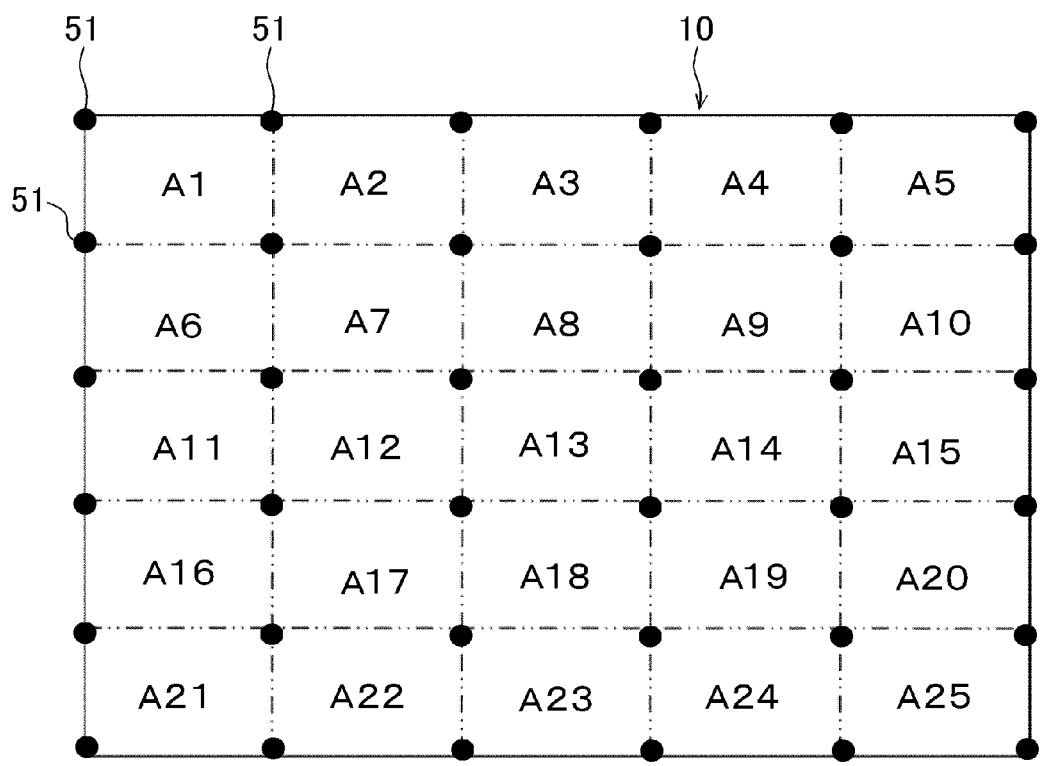
FIG. 13 is a diagram showing another example of the arrangement of temperature detectors for measuring an actual temperature of the liquid crystal panel.

The provision of temperature measurement positions is not limited to that described above. For example, plural temperature detectors 51 may be provided in each area. That is, plural temperature measurement positions may be associated with one area. In the example shown in FIG. 13, a temperature measurement position is provided at the corners of each area, and four temperature measurement positions are associated with one area. When the temperature measurement positions are provided in this manner, an actual temperature of one area Am is calculated from measured temperatures at plural temperature measurement positions associated with the area Am. For example, the average value of the measured temperatures at the plural temperature measurement positions is used as the actual temperature of the area Am. Then, for the area Am, the output value of the temperature sensor 41 and the calculated temperature of the area Am are used to obtain an approximate expression including the coefficients $K_{Am}$, $R_{Am}$, $H_{Am}$, and $OFS_{Am}$.

As described above, the temperature relation information representing the relation between the output value of the temperature sensor 41 and the temperature of each of the plural areas A1 to A25 defined on the liquid crystal panel 10 is stored in the memory 3 in advance. The controller 2 acquires the output value of the temperature sensor 41 and estimates the temperature of each of the areas A1 to A25 based on the temperature relation information and the acquired output value. Therefore, it is possible to obtain the temperature of each of the plural areas A1 to A25 defined on the liquid crystal panel 10 with a small number of temperature sensors.

The invention is not limited to the liquid crystal display device 1 described above but can be modified variously.

For example, in the liquid crystal display device 1 described above, one temperature sensor 41 is provided. However, many more temperature sensors may be provided in the liquid crystal display device 1.

Figure 14:
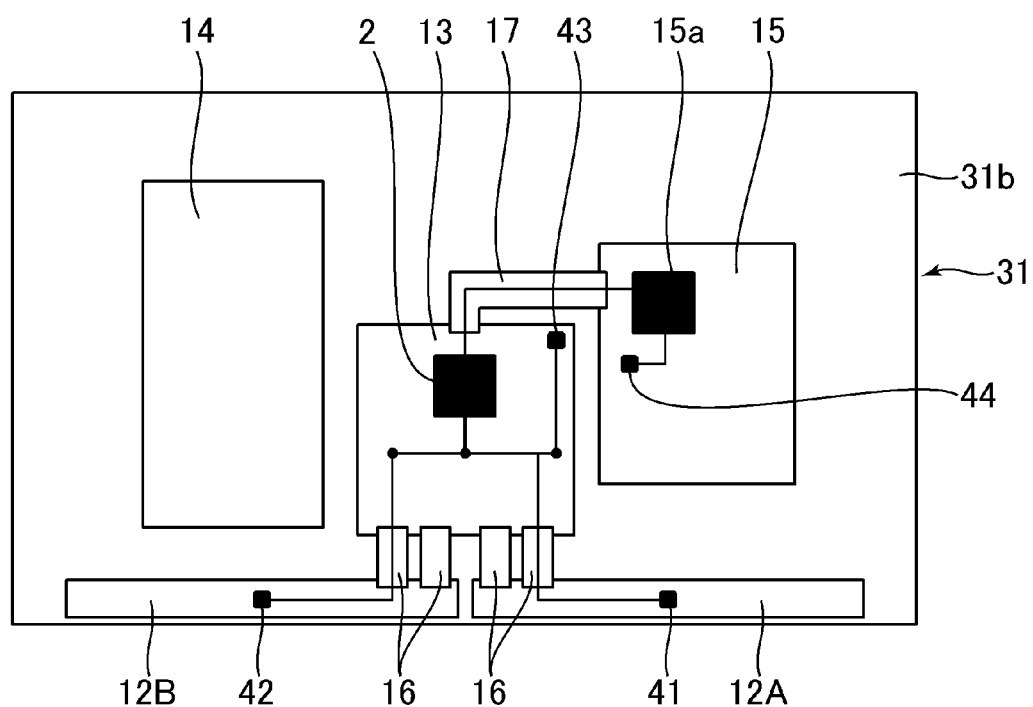
FIG. 14 is a schematic view showing the rear side of a rear frame included in a liquid crystal display device of another example.

FIG. 14 is a rear side view of the rear frame 31 included in a liquid crystal display device of this example. In this drawing, the same reference and numeral signs are assigned to the same portions as those described so far. Hereinafter, only the differences from the liquid crystal display device 1 described so far will be described, and the matters not described herein are similar to those of the liquid crystal display device 1.

The liquid crystal display device shown in FIG. 14 includes plural temperature sensors 41, 42, 43, and 44 which are disposed away from each other. Also in this example, the number of areas defined on the liquid crystal panel 10 is larger than the number of temperature sensors. The temperature sensor 42 is attached to the circuit board 12B attached at the lower edge of the rear frame 31. The temperature sensor 41 and the temperature sensor 42 are located away from each other in a direction along the lower edge of the rear frame 31. The temperature sensor 43 is attached to the TFT control circuit board 13. The temperature sensor 44 is attached to the application circuit board 15. Output signals of the sensors 41 to 44 are input to the controller 2 directly or indirectly. In the example of the drawing, the outputs of the temperature sensors 41, 42, and 43 are directly input to the controller 2, while the output of the temperature sensor 44 is input to the controller 2 through an IC chip 15a mounted on the application circuit board 15. In the liquid crystal display device, many more temperature sensors may be provided. For example, plural (for example, three) temperature sensors located away from each other so as to surround the controller 2 may be provided on the TFT control circuit board 13.

In this example, temperature relation information representing a relation between the output values of the plural temperature sensors 41 to 44 and the temperature of each of the plural areas A1 to A25 are stored in the memory 3 in advance. For example, a fundamental relation formula serving as a source of temperature relation formulas for the areas A1 to A25 and plural constant groups respectively associated with the areas A1 to A25 are stored in the memory 3 as the temperature relation information. The temperature estimating section 2b uses the temperature relation formula defined by the constant group corresponding to each area to calculate the temperature of a relevant area based on the output values of the plural temperature sensors 41 to 44.

The fundamental relation formula of this example is expressed by, for example, Expression (3).

$$T = K1 \times Td1(i) + R1 \times F(Td1(i), H1) + K2 \times Td2(i) + R2 \times F(Td2(i), H2) + K3 \times Td3(i) + R3 \times F(Td3(i), H3) + K4 \times Td4(i) + R4 \times F(Td4(i), H4) + OFS \quad (3)$$

$Td1(i)$, $Td2(i)$, $Td3(i)$, and $Td4(i)$ are the latest output values of the temperature sensors 41, 42, 43, and 44, respectively. K1 to K4, R1 to R4, H1 to H4, and OFS are constants. When the temperature of each area is calculated, specific constants corresponding to a relevant area are applied. For example, when the temperature of an area Am is calculated (m=1, 2, ..., and 25), constants ($K1_{Am}$ to $K4_{Am}$, $R1_{Am}$ to $R4_{Am}$, $H1_{Am}$ to $H4_{Am}$, and $OFS_{Am}$) associated with the area Am are applied to the constants K1 to K4, R1 to R4, H1 to H4, and OFS of Expression (3). F is a filter function similar to that shown in Expression (2) and defined by the filter coefficients H1 to H4.

As shown by Expression (3), the temperature relation formula of this example is a first order filter function of the output values of the temperature sensors 41, 42, 43, and 44. Therefore, the processing load of temperature estimation is reduced. The temperature relation formula is not limited to that. For example, the temperature relation formula may be a second order filter function or a third order filter function of the output value of any of the temperature sensors.

The plural constant groups respectively associated with the areas A1 to A25 and the fundamental relation formula (3) to which the plural constant groups can be applied selectively are stored in the memory 3 in advance. The constant groups are also stored in the memory 3 in association with the areas, similarly to the constant table described with reference to FIG. 7.

Even when the temperature relation information described above is stored in the memory 3, the process executed by the sensor output acquiring section 2a and the temperature estimating section 2b is similar to the form described above. That is, the sensor output acquiring section 2a acquires the output values of the temperature sensors 41, 42, 43, and 44 with a predetermined sampling period. In the process for estimating the temperature of an area Am, the temperature estimating section 2b first selects a constant group corresponding to the area Am from the plural constant groups. Then, the temperature estimating section 2b uses a temperature relation formula defined by the selected constant group and the fundamental relation formula shown by Expression (3) to calculate the temperature of the area Am from the output values of the plural temperature sensors 41, 42, 43, and 44. The temperature estimating section 2b executes the process described above for all the areas A1 to A25.

When the plural temperature sensors 41, 42, 43, and 44 are provided in the liquid crystal display device like this example, the temperature estimating section 2b may determine, by the following process, whether or not a sufficient time has elapsed since the end of previous driving of the liquid crystal display device, that is, whether or not a present time falls to the steady-state period.

If a sufficient time has elapsed since the end of previous driving of the liquid crystal display device, the output values of the temperature sensors 41, 42, 43, and 44 become values depending on environmental temperature and are equal to each other. The temperature sensors 41, 42, 43, and 44 are different from each other in attachment position or distance from the LEDs 21. That is, the temperature sensors 41, 42, 43, and 44 are different from each other in conductivity of heat of the LEDs 21. Therefore, in the steady-state period, differences are generated in the output values of the temperature sensors 41, 42, 43, and 44. Therefore, the temperature estimating section 2b determines that a present time falls to the steady-state period if a difference in output value between any two of the temperature sensors is larger than a threshold value. That is, the temperature estimating section 2b may use, as information changing according to the elapsed time since the start of driving of the liquid crystal display device, the difference in output value between two temperature sensors. For example, if a difference between the output value of a temperature sensor (the temperature sensor 41 or 42 in this example) provided at a position most susceptible to heat from the LEDs 21 and the output value of another temperature sensor (the temperature sensor 43 or 44 in this example) located away from the temperature sensor mentioned before is larger than a threshold value, the temperature estimating section 2b may determine that the present time falls to the steady-state period.

A method for obtaining the constants associated with each of the areas A1 to A25 in a manufacturing process of the liquid crystal display device is similar to that described above. That is, the liquid crystal display device is driven while changing the drive mode of the backlight unit 20 in plural temperature environments. At that time, an actual temperature of each of the areas A1 to A25 of the liquid crystal panel 10 is measured with a fixed time interval, and the output values of the temperature sensors 41, 42, 43, and 44 are acquired. Then, the output values of the temperature sensors 41, 42, 43, and 44 are used to obtain an approximate expression for the measured temperature.

While there have been described what are at present considered to be certain embodiments of the invention, it will be understood that various modifications may be made thereto, and it is intended that the appended claims cover all such modifications as fall within the true spirit and scope of the invention.

What is claimed is:

1. The liquid crystal display device comprising:
at least one temperature sensor;
a liquid crystal panel having a plurality of areas defined thereon, wherein the number of the plurality of areas is larger than that of the at least one temperature sensor;
a memory having temperature relation information stored therein in advance, the temperature relation information representing a relation between an output value of the at least one temperature sensor and a temperature of each of the plurality of areas;
a controller which receives an output value of the at least one temperature sensor and estimates, based on the temperature relation information and the received output value of the at least one temperature sensor, a temperature of each of the plurality of areas; wherein
the controller uses a plurality of relation formulas defined by the temperature relation information to thereby estimate the temperature s of the plurality of areas, wherein each of the plurality of relation formulas represents the relation between the output value of the at least one temperature sensor and the temperature of each of the plurality areas,
the memory has a plurality of coefficients stored therein as the temperature relation information, the plurality of coefficients being associated with the plurality of areas respectively,
the plurality of relation formulas are defined by a fundamental relation formula to which the plurality of coefficients are applied, respectively,
the fundamental relation formula includes, as its variables, a latest output value of the at least one temperature sensor and a value based on a preceding output value of the at least one temperature sensor, and
the fundamental relations formula includes Infinite Impulse Response Filter function which includes, as its variable, the value based on the preceding output value of the at least one temperature sensor.

2. The liquid crystal display device according to claim 1, further comprising a backlight unit including a light guide plate and a light source disposed at least one side of the light guide plate.

3. The liquid crystal display device according to claim 2, further comprising a circuit board having the at least one temperature sensor attached thereon and disposed along the at least one side of the light guide plate.

4. The liquid crystal display device according to claim 3, further comprising a rear frame made of metal and covering the rear side of the backlight unit, wherein
the circuit board is fixed to the rear frame.

5. The liquid crystal display device according to claim 2, further comprising a plurality of circuit boards, wherein
the at least one temperature sensor is attached to one of the plurality of circuit boards which is closest to the light source.

6. The liquid crystal display device according to claim 2, wherein
the light source is composed of a plurality of LEDs.

* * * * *